US012321113B2

(12) United States Patent
Koyama et al.

(10) Patent No.: US 12,321,113 B2
(45) Date of Patent: Jun. 3, 2025

(54) FIXING APPARATUS TO FIX A TONER IMAGE TO A PRINTING MATERIAL

(71) Applicant: CANON KABUSHIKI KAISHA, Tokyo (JP)

(72) Inventors: Fuyuko Koyama, Kanagawa (JP); Kenichi Ogawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/487,792

(22) Filed: Oct. 16, 2023

(65) Prior Publication Data

US 2024/0126195 A1 Apr. 18, 2024

(30) Foreign Application Priority Data

Oct. 18, 2022 (JP) ................................ 2022-166627

(51) Int. Cl.
*G03G 15/20* (2006.01)

(52) U.S. Cl.
CPC ..... *G03G 15/2028* (2013.01); *G03G 15/2064* (2013.01); *G03G 2215/2035* (2013.01)

(58) Field of Classification Search
USPC .......................................................... 399/328
See application file for complete search history.

(56) References Cited

U.S. PATENT DOCUMENTS

| | | | | |
|---|---|---|---|---|
| 2005/0006370 A1* | 1/2005 | Suzumi | G03G 15/2064 219/216 |
| 2013/0272762 A1* | 10/2013 | Uekawa | G03G 15/2017 399/329 |
| 2015/0037078 A1* | 2/2015 | Ohta | G03G 15/2053 399/329 |
| 2016/0223971 A1* | 8/2016 | Moriya | G03G 15/206 |
| 2017/0219969 A1* | 8/2017 | Umeda | G03G 15/2039 |
| 2018/0113405 A1* | 4/2018 | Yasui | G03G 15/2028 |

FOREIGN PATENT DOCUMENTS

| | | |
|---|---|---|
| JP | 2008275756 A | 11/2008 |
| JP | 2012123329 A | 6/2012 |
| JP | 2018105900 A | 7/2018 |
| JP | 2020122850 A | 8/2020 |

* cited by examiner

*Primary Examiner* — Quana Grainger
(74) *Attorney, Agent, or Firm* — Canon U.S.A., Inc. I.P. Division

(57) ABSTRACT

A fixing apparatus to fix a toner image to a printing material while nipping and conveying the printing material at a fixing nip includes a film, a guide member, a nip-forming member in a recess of the guide member, a roller, a support member, and a moving mechanism. The guide member in an inner space of the film guides film rotation. The roller is in contact with a film outer circumferential surface. The roller sandwiches the film with the nip-forming member to form the fixing nip. When disposed in the recess, the nip-forming member is movable in a direction parallel to a conveying direction of the printing material. The support member is fixed to an end of the nip-forming member in a longitudinal direction. The moving mechanism moves the support member relative to the guide member in the direction parallel to the conveying direction.

6 Claims, 16 Drawing Sheets

FIXING APPARATUS TO FIX A TONER IMAGE TO A PRINTING MATERIAL

BACKGROUND

Field

The present disclosure relates to fixing apparatuses configured to fix toner images formed on printing materials to the printing materials.

Description of the Related Art

There are fixing apparatuses mounted in electrophotographic apparatus that employ a conventional film heating method in which a printing material is nipped and conveyed between a tubular film and a pressure roller. One example of a conventional film heating method employs a configuration in which a ceramic heater is disposed in the inner space of the film, and the film is sandwiched between the ceramic heater and a pressure roller, with the film therebetween. Other examples include a configuration in which the film has an electrically conducting layer, and the film is heated using electromagnetic induction and a configuration in which a feed terminal is brought into contact with the electrically conducting layer of the film to feed electricity to the film, thereby heating the film.

In a conventional fixing apparatus of a film heating system, an inner surface of the film and a film backup member, such as a ceramic heater, slide past each other. For this reason, the inner surface of the film is coated with lubricant, such as heat-resisting grease. However, the lubricant is gradually swept out of the film as the fixing apparatus is used, decreasing in amount. Furthermore, the lubricant itself deteriorates due to repetition of the sliding, decreasing in lubrication performance. Accordingly, the fixing apparatus of the film heating system requires keeping the lubrication performance of the lubricant well for a long period.

A ceramic heater of a fixing apparatus in Japanese Patent Laid-Open No. 2008-275756 and a sliding member in Japanese Patent Laid-Open No. 2018-105900 each form a fixing nip. The fixing apparatus of Japanese Patent Laid-Open No. 2008-275756 has a configuration in which a film is rotated backward at a timing when no printing material is passing through the fixing apparatus to move grease accumulated downstream from a fixing nip in the film, which is not responsible for sliding, upstream in a direction of rotation of the film. This allows the grease to be efficiently used, increasing the lubrication performance of an inner surface of the film for the duration.

In the above noted conventional fixing apparatus, grease not responsible for sliding accumulates downstream from where the printing material is nipped at a nip and conveyed. However, the accumulated grease not responsible for sliding is not the only the grease accumulated downstream from the nip. Nips formed of members such as a sliding member or a ceramic heater may be fitted in a recess of a film support member supporting the film from the inner surface. The sliding member or the ceramic heater and the film support member necessarily form a small clearance in consideration of, for example, thermal expansion of the members and mounting thereof. The grease pressured at the nip is pushed into the clearance.

Grease pushed into the small clearance cannot be efficiently used. That is, grease thus sandwiched between the ceramic heater or the sliding member and the film support member in the conventional fixing apparatus cannot make contact with the inner surface of the film and therefore cannot contribute to the sliding of the film. It is difficult to move such accumulated grease to where the grease can be efficiently used.

SUMMARY

The present disclosure provides a long-life fixing apparatus.

According to an aspect of the present disclosure, a fixing apparatus to fix a toner image to a printing material on which the toner image is formed while nipping and conveying the printing material at a fixing nip, includes a film having a tubular shape around an inner space of the film, a guide member that is configured to guide rotation of the film and is in the inner space of the film, a nip-forming member that is plate-like and is in a recess of the guide member, a roller in contact with an outer circumferential surface of the film, wherein the roller sandwiches the film with the nip-forming member to form the fixing nip, the recess is larger in width than the nip-forming member in a conveying direction of the printing material, and, when disposed in the recess, the nip-forming member is movable in a direction parallel to the conveying direction, a support member fixed to an end of the nip-forming member in a longitudinal direction, and a moving mechanism configured to move the support member relative to the guide member in the direction parallel to the conveying direction.

Further features of the present disclosure will become apparent from the following description of exemplary embodiments with reference to the attached drawings.

DESCRIPTION OF THE EMBODIMENTS

Embodiments of the present disclosure will be described hereinbelow with reference to the drawings. It is to be understood that the dimensions, the materials, the shapes, and the relative positional relationship of the components described in the embodiments can be changed depending on the configuration of apparatuses to which the disclosure is applied and various conditions and are not intended to limit the scope of the disclosure to the following embodiments.

First Embodiment

Image Forming Apparatus

Figure 1:
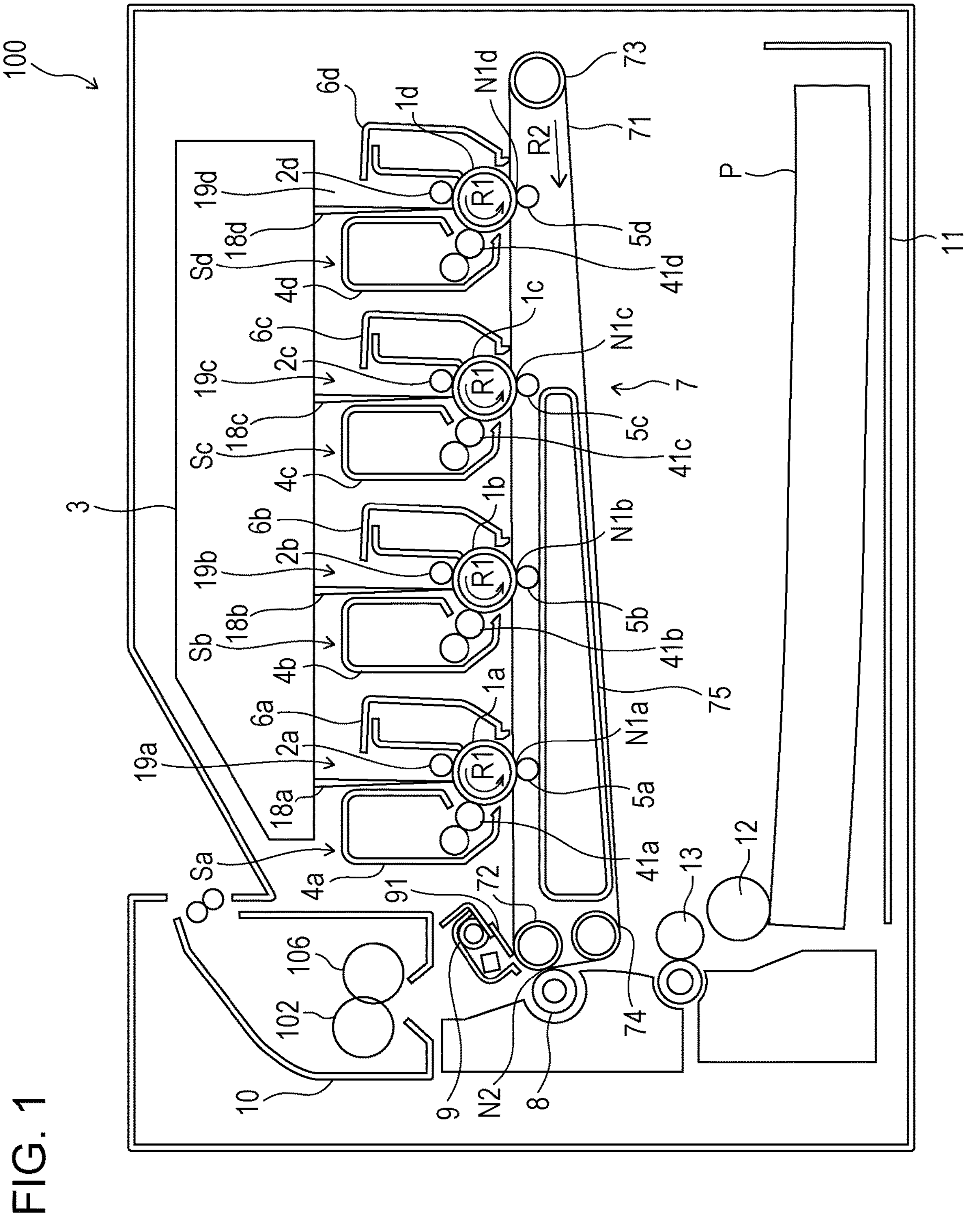
FIG. 1 is a cross-sectional view of an image forming apparatus.

FIG. 1 is a schematic cross-sectional view of an image forming apparatus 100 illustrating the configuration thereof. The image forming apparatus 100 of this embodiment is an electrophotographic image forming apparatus including a plurality of image forming units Sa to Sd. The first image forming unit Sa forms images with a yellow (Y) toner, the second image forming unit Sb forms images with a magenta (M) toner, the third image forming unit Sc forms images with a cyan (C) toner, and the fourth image forming unit Sd forms images with a black (Bk) toner. The four image forming units Sa to Sd are arranged in line at regular intervals and have substantially the same configuration except the color of the contained toner. Accordingly, suffixes a, b, c, and d attached to the signs to indicate that the components are provided for any of the individual colors are omitted, and the image forming units are described as a whole in the following description unless otherwise distinguished.

The image forming unit S includes a photosensitive drum 1, a charging roller 2 that charges the photosensitive drum 1, a developing unit 4, and a drum cleaning unit 6. In this embodiment, the photosensitive drum 1, the charging roller 2, the developing unit 4, and the drum cleaning unit 6 are integrated to constitute a process cartridge 19 which is detachably attached to the apparatus main body of the image forming apparatus 100.

The photosensitive drum 1 is rotationally driven at a predetermined process speed in the direction of arrow R1 in FIG. 1. The developing unit 4 includes a developing roller 41 for supplying toner to the photosensitive drum 1. The drum cleaning unit 6 is used to collect the toner attached to the photosensitive drum 1.

A scanner unit 3 emits laser light 18 according to image information to the photosensitive drum 1 and scans the photosensitive drum 1 with the laser light 18. This causes a static latent image to be formed on the surface of the photosensitive drum 1.

When an image forming operation is started when a control unit (not shown) receives an image signal, a static latent image corresponding to the image information is formed on the photosensitive drum 1 in each image forming unit S by scanning with the scanner unit 3 and charging with the charging roller 2. Next, the static latent image is developed with the developing roller 41 to form a toner image on the photosensitive drum 1.

The toner image formed on the photosensitive drum 1 of each image forming unit S is transferred to an intermediate transfer belt 71 rotating in the direction of arrow R2 at the primary transfer portion N1. This causes the toner images of four colors to be superposed on the intermediate transfer belt 71. The intermediate transfer belt 71 is stretched round three rollers: a driving roller 72, a tension roller 73, and a driven roller 74. The toner image on the photosensitive drum 1 is transferred to the intermediate transfer belt 71 with a voltage applied to the transfer roller 5. Toner remaining on the photosensitive drum 1 without being primarily transferred to the intermediate transfer belt 71 is removed by the drum cleaning unit 6.

Printing materials P contained in a sheet cassette 11 is fed by a sheet feeding roller 12 and then conveyed by a conveying roller 13. The toner image on the intermediate transfer belt 71 is transferred to the printing material P at a secondary transfer portion N2. The toner image on the intermediate transfer belt 71 is transferred to the printing material P with a voltage applied to a secondary transfer roller 8. Reference sign 9 denotes a cleaner for cleaning the intermediate transfer belt 71, and reference sign 91 denotes a cleaning member of the cleaner 9.

The printing material P to which the toner image is transferred is conveyed to a fixing apparatus 10, where the toner image is fixed. The printing material P to which the toner image is fixed is discharged outside the image forming apparatus 100.

Fixing Apparatus

Figure 2:
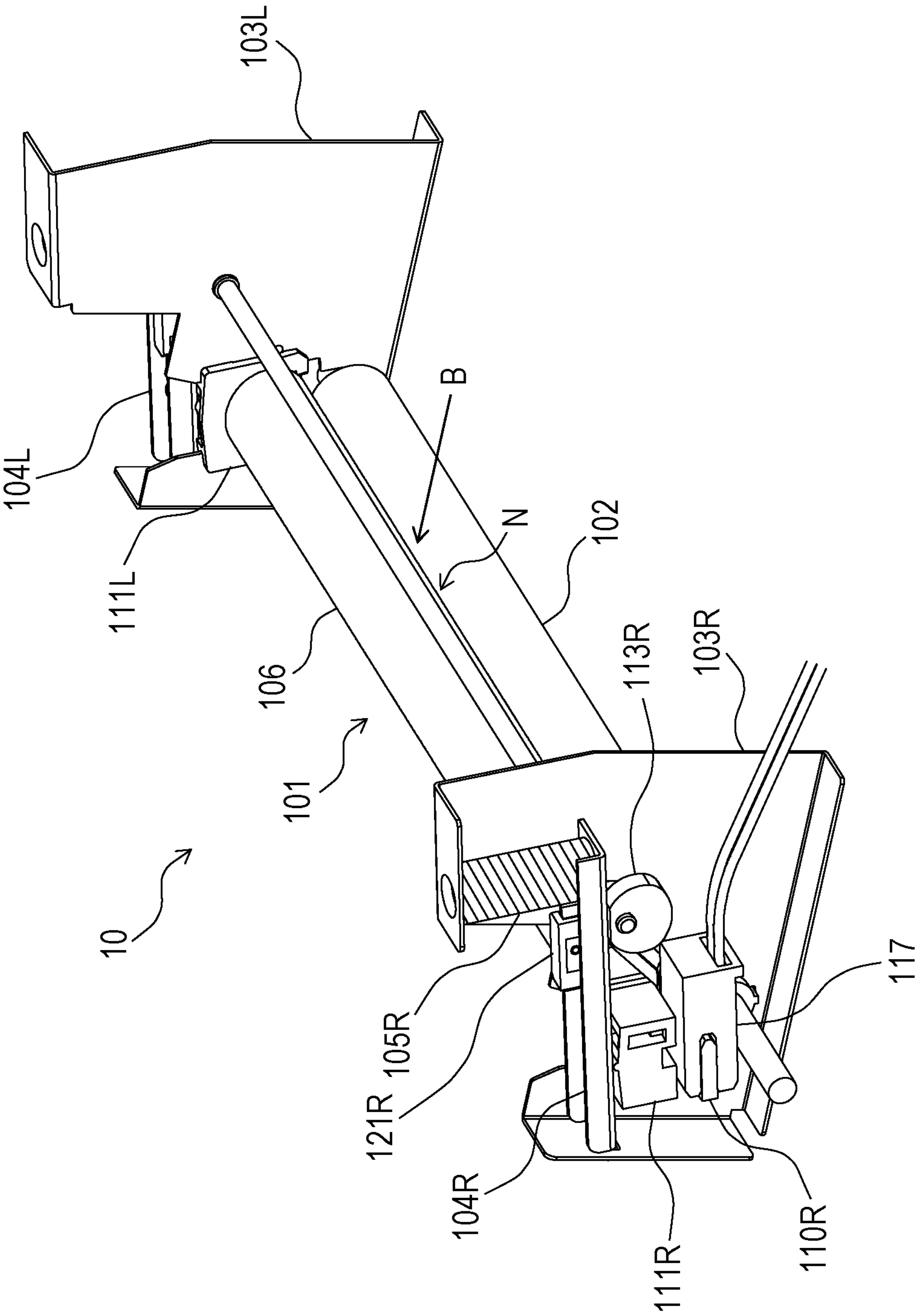
FIG. 2 is a perspective diagram illustrating the configuration of a fixing apparatus according to a first embodiment.
Figure 3:
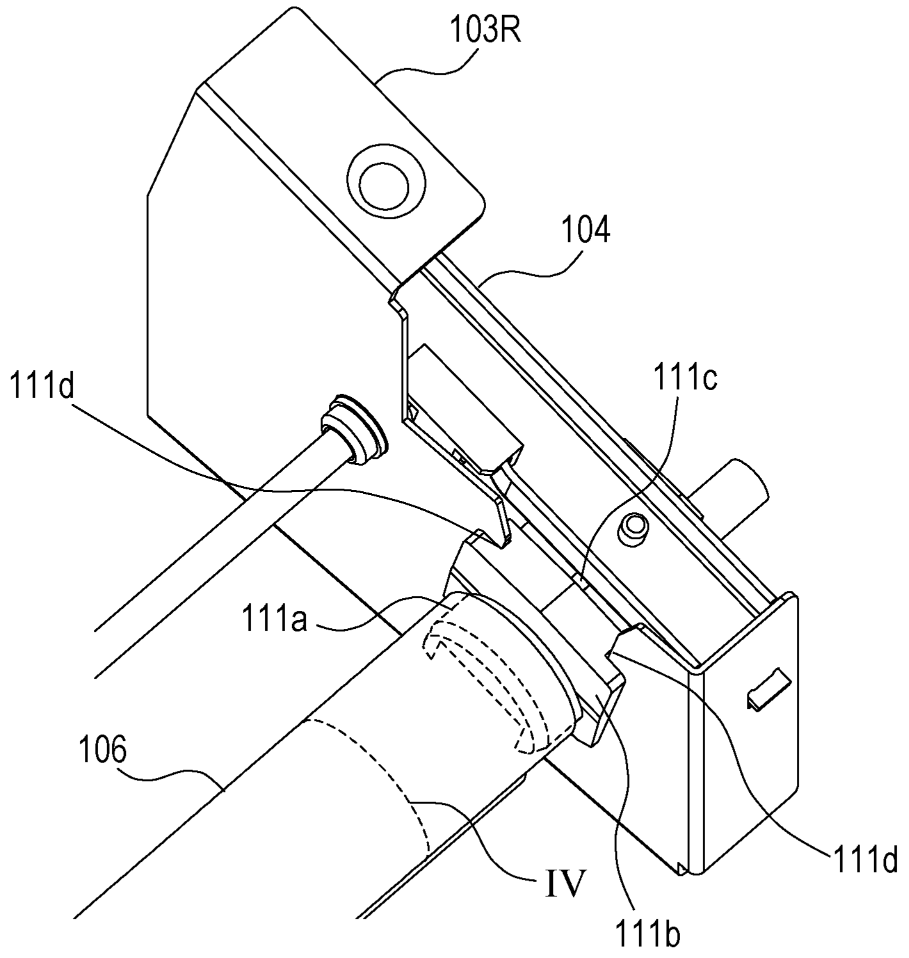
FIG. 3 is a perspective diagram illustrating the configuration of the fixing apparatus according to the first embodiment.
Figure 4:
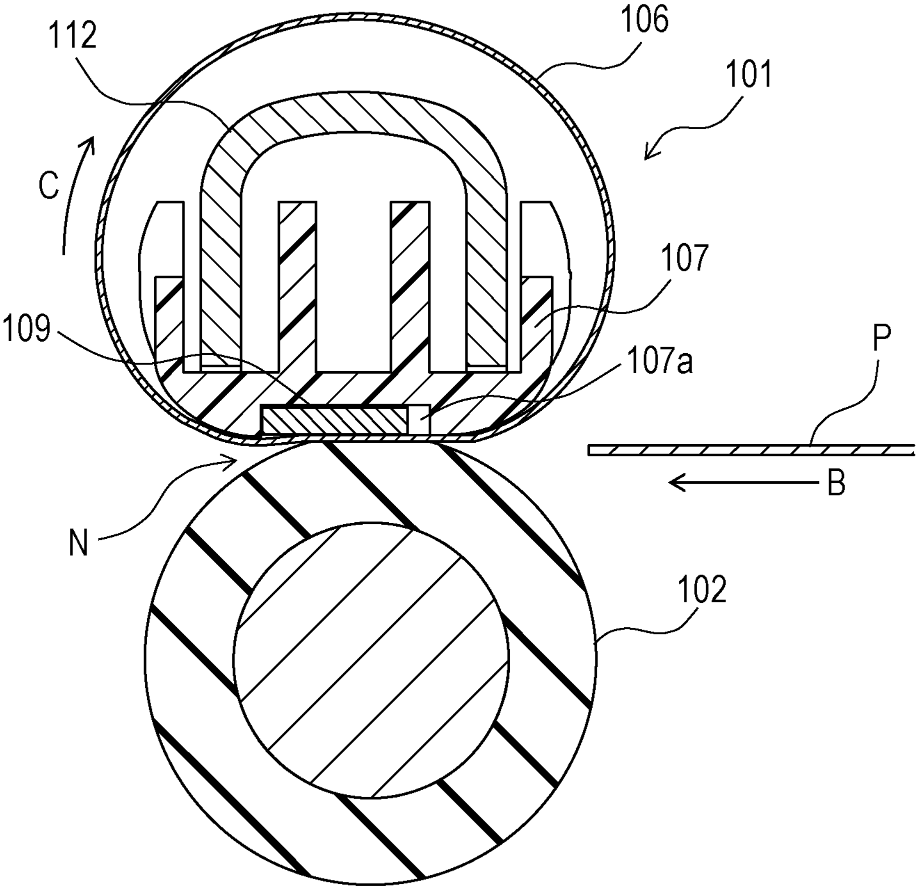
FIG. 4 is a cross-sectional view of the fixing apparatus according to the first embodiment illustrating the configuration thereof.
Figure 5:
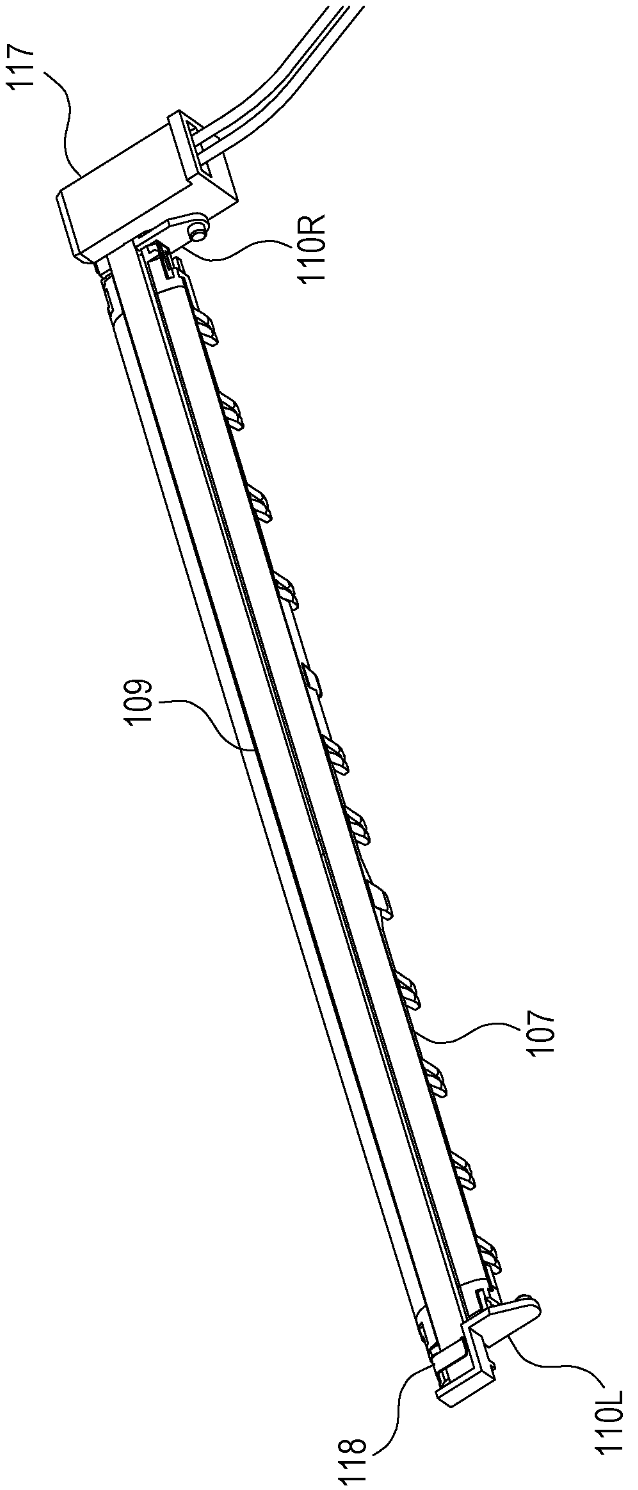
FIG. 5 is a perspective diagram illustrating the configuration of the inside of a film unit according to the first embodiment.

The fixing apparatus 10 is a film heating fixing apparatus. FIG. 2 is a perspective view of the fixing apparatus 10. FIG. 3 is a perspective view of the fixing apparatus 10 viewed from inside a side plate 103R. FIG. 4 is a cross-sectional view of the fixing apparatus 10 taken along a plane taken along a broken line IV in FIG. 3. FIG. 5 is a perspective view of the configuration around a guide member 107, which supports a film 106 from the inside, and a heater 109.

A pressure roller (roller) 102 includes a metal core made of metal, such as iron or aluminum, an elastic layer made of silicone rubber or the like provided around the outer circumferential surface of the metal core, and a releasing layer made of a fluorine resin or the like provided around the outer circumferential surface of the elastic layer. The pressure roller 102 is rotatably attached to side plates 103L and 103R with bearings. The metal core is fitted with a gear (not shown) at one end and is rotated by the driving force from a motor (not shown).

A film unit 101 including the tubular film 106 is urged to the pressure roller 102 by compression springs 105 via pressure plates 104L and 104R. The printing material P is heated by the heat from the heater 109 while being nipped and conveyed in a fixing nip N formed between the film unit 101 and the pressure roller 102 in a direction B shown in FIG. 2. The heat and the pressure cause the toner image to be fixed to the printing material P.

Next, the internal configuration of the film unit 101 will be described. FIG. 4 is a cross-sectional view of the fixing apparatus 10 taken along a plane passing the broken line IV in FIG. 3. FIG. 5 is a perspective view of the guide member 107 supporting the film 106 from inside and the heater 109 illustrating the peripheral configuration thereof. The film unit 101 includes the tubular film 106 and the guide member 107 made of a heat-resisting resin provided in the inner space of the film 106 and guiding the rotation of the film 106. The film unit 101 further includes flanges 111L and 111R provided at positions corresponding to the opposite ends of the film 106 and rotatably supporting the film 106 from inside. The film unit 101 includes the heater 109 and a metallic reinforcing stay 112 for reinforcing the guide member 107.

The film 106 has, on a base layer with a thickness of about 30 to 100 μm, a surface layer made of a fluorine resin, such as (tetrafluoroethylene-perfluoroalkylvinylether copolymer (PFA) or polytetrafluoroethylene (PTFE). The material of the base layer is polyimide. The base layer of the film 106 may be made of metal, such as stainless steel, or alternatively, a rubber layer made of silicone rubber may be provided between the base layer and the surface layer.

The heater (nip-forming member) 109 is a plate-like member, which is elongated in the direction perpendicular to the conveying direction of the printing material P, and in which a resistance heating element is printed on a ceramic substrate. The resistance heating element is formed like a narrow band by screen-printing a paste in which silver, palladium, and glass powder (an inorganic binder) and an organic binder are blended and kneaded on the substrate. The resistance heating element generates heat when electric power is supplied via an electric contact provided on the surface of the heater 109. The material of the substrate may be metal, such as stainless steel. An insulating layer, such as glass, may be provided on the surface of the metal layer, and the resistance heating element may be provided on top of the insulating layer.

As shown in FIG. 5, the guide member 107 extends in the longitudinal direction of the film 106 and has a recess 107*a*, at the center, for housing the heater 109 across the entire area in the longitudinal direction. The guide member 107 is made of resin, such as a liquid-crystal polymer, a polyphenylene sulfide resin (PPS) or a polyether ether ketone (PEEK). As shown in FIGS. 4 and 5, the recess 107*a* at the center of the guide member 107 houses the heater 109 serving as a heat source. The fixing nip N is formed by the heater 109 and the pressure roller 102 with the film 106 therebetween. The film 106 is driven to rotate as the pressure roller 102 rotates. In FIG. 4, arrow B indicates the conveying direction of the printing material P, and arrow C indicates the rotation direction of the film 106.

The width of the recess 107*a* in the guide member 107 is larger than the width of the heater 109 in the conveying direction of the film 106. For this reason, there is a gap between them. The guide member 107 has support members 110L and 110R, which supports the opposite ends of the heater 109, attached at the opposite ends in the longitudinal direction of the heater 109 so as to be movable in the conveying direction of the film 106 (in the direction of arrow B in FIG. 4) at the fixing nip N.

Thus, the fixing apparatus 10 includes the tubular film 106 and the guide member 107 provided in the inner space of the film 106 to guide the rotation of the film 106. The fixing apparatus 10 further includes the plate-like heater 109 disposed in the recess 107*a* of the guide member 107 and the pressure roller 102 which is in contact with the outer circumferential surface of the film 106 to form the fixing nip N together with the heater 109, with the film 106 sandwiched therebetween. The width of the recess 107*a* is larger than the heater 109 in the conveying direction of the printing material P. The heater 109, while being disposed in the recess 107*a*, is movable in the direction parallel to the conveying direction. The fixing apparatus 10 fixes the toner image to the printing material P while conveying the printing material P, on which the toner image is formed, nipped at the fixing nip N.

Figure 6:
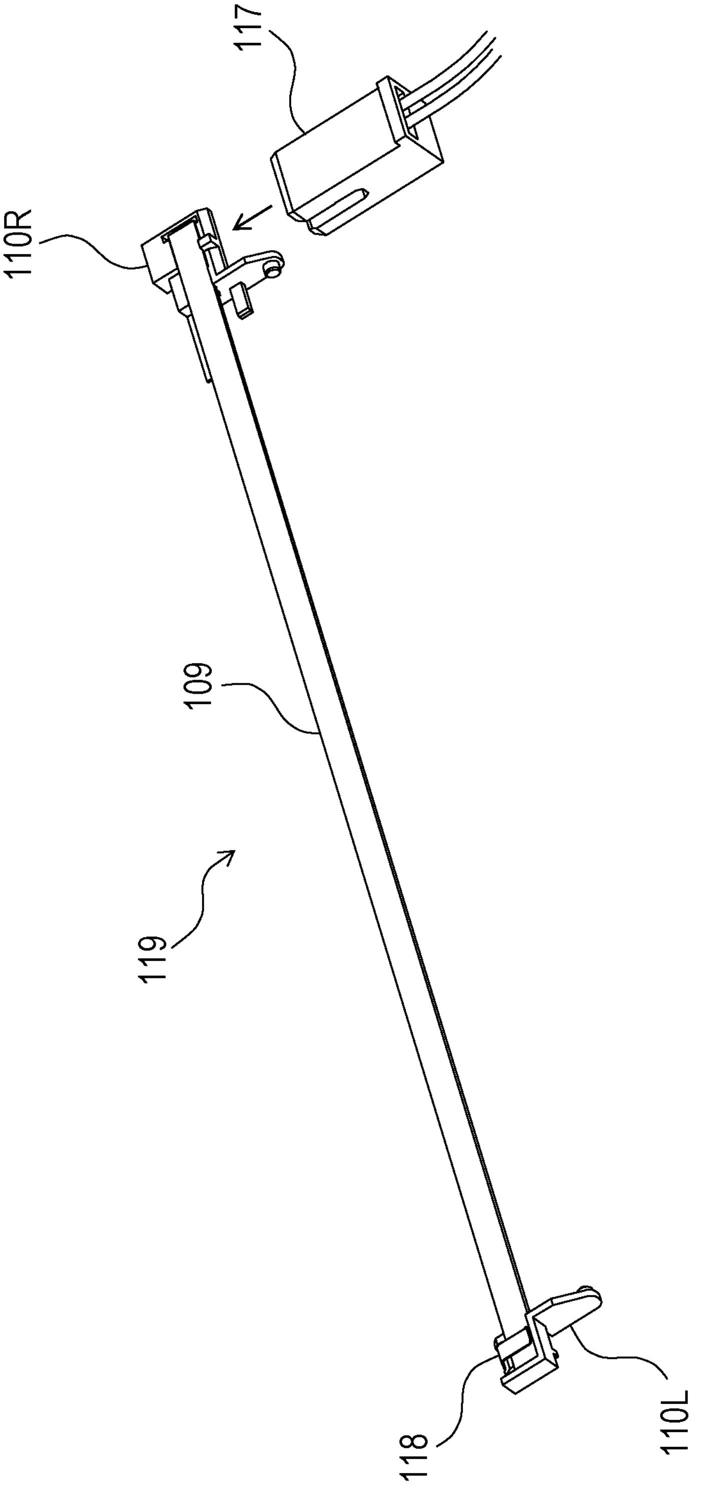
FIG. 6 is a perspective diagram illustrating the configuration of a heater unit according to the first embodiment.

FIG. 6 illustrates a state in which the guide member 107 is removed from the perspective view of FIG. 5 (a state before a feeding connector 117 is attached to the heater 109). As shown in FIG. 6, the support members 110R and 110L and the opposite ends of the heater 109 are positioned in the film conveying direction at the fixing nip N and secured by the feeding connector 117 and a metal clip 118, respectively. In other words, an end of the heater 109 adjacent to the electric contact is fixed to the support member 110R by the feeding connector 117. The opposite end of the heater 109 is fixed to the support member 110L by the metal clip 118. Thus, the heater 109, the support members 110L and 110R, the feeding connector 117, and the clip 118 are joined together. The support members 110R and 110L, the feeding connector 117, the clip 118, and the heater 109 which move together with the heater 109 are referred to as a heater unit 119.

Meanwhile, there is play between the heater 109 and the recess 107*a* of the guide member 107 in the film conveying direction at the fixing nip N, as described above. The support members 110L and 110R are movable relative to the guide member 107 in the conveying direction of the film 106 at the fixing nip N. This allows the heater unit 119 to move relative to the guide member 107 in the film conveying direction while no pressure is applied by the compression spring 105.

The fixing apparatus 10 further includes a thermistor (not shown) for detecting the temperature of the heater 109 so that the heater 109 can be adjusted to a predetermined temperature.

Next, the pressurizing configuration (pressure applying mechanism) of the film unit 101 will be described. As shown in FIGS. 2 and 3, the flange 111R has a surface 111*a* that rotatably supports the inner surface of the film 106, a surface 111*b* that restricts an end of film 106, and a surface 111*c* to be pushed by the pressure plate 104R. The flange 111R further has a groove 111*d* for use in inserting the flange 111R into the side plate 103R and is attached to the side plate 103R so as to be movable in the pressure direction of the pressure roller 102. The flange 111R is pushed to the pressure roller 102 by being pushed by the compression spring 105R via the pressure plate 104R. The pressure that the flange 111R has received is transmitted to the reinforcing stay 112 and the guide member 107, so that the heater 109 is pushed to the pressure roller 102.

The opposite flange 111L has the same configuration as the flange 111R. Thus, the flanges 111L and 111R are pushed to the pressure roller 102, so that the entire film unit 101 is pushed to the pressure roller 102.

Lubricant

Heat-resisting grease is applied between the heater 109 and the fixing film 106. The grease is mainly composed of base oil having a lubricating function and thickener for holding the base oil. This embodiment uses perfluoropolyether as the base oil and HP-300 grease from Dow Toray co., Ltd. made of polytetrafluoroethylene (PTFE) as the thickener.

The grease applied onto the surface of the heater 109, even if it keeps preferable lubricating performance at the beginning of the duration, will decrease in lubricating performance with the use of the fixing apparatus 10. Furthermore, the grease is gradually discharged from the ends of the film 106 due to the pressure and rotation at the fixing nip N, which decreases the total amount of grease circulating in the film 106. The decrease in lubricating performance due to the deterioration of the grease and the amount of grease circulating in the film 106 reduces the lubricating performance between the heater 109 and the film 106. This may cause a phenomenon called stick slip in which the film does not rotate stably.

Furthermore, part of the grease applied onto the heater surface may be accumulated between the recess 107*a* of the guide member 107 and the heater 109 with the use of the fixing apparatus 10 and cannot circulate in the film 106. The accumulated grease, although with low deterioration and with sufficient base oil, cannot contribute to the sliding between the heater 109 and the film 106.

This embodiment makes the grease accumulated in the recess 107*a* extruded by moving the heater 109 relative the guide member 107, enabling the grease to be functioned as a lubricant.

Heater Moving Mechanism

Figure 7:
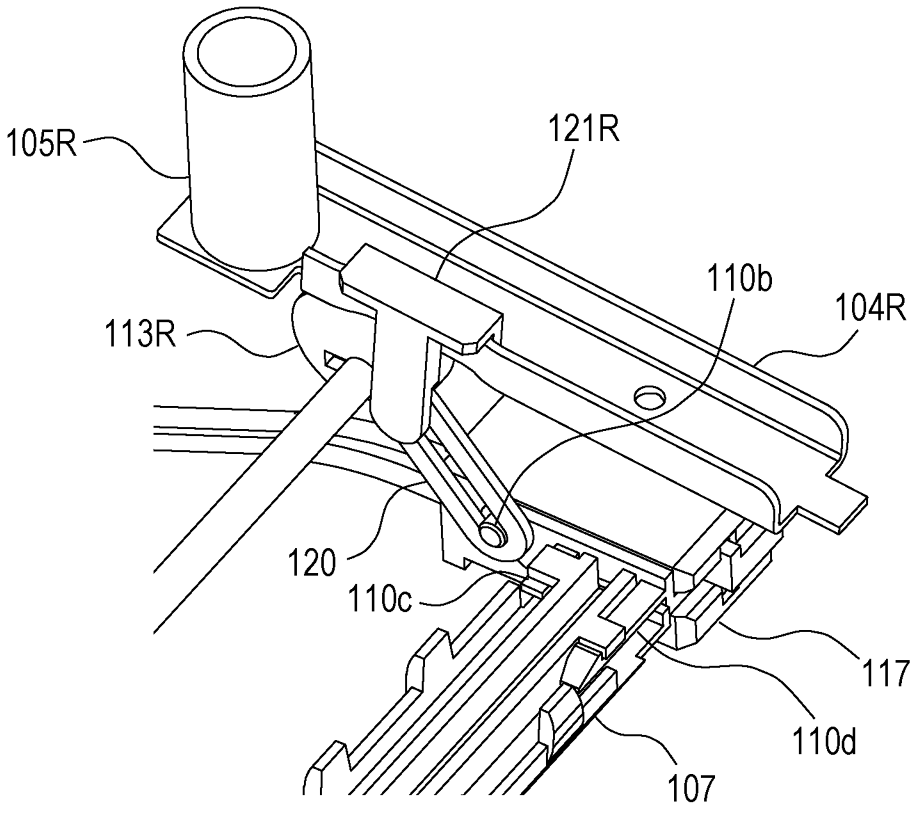
FIG. 7 is a perspective diagram illustrating the configuration of the fixing apparatus according to the first embodiment.

Next, the mechanism for moving the heater 109 will be described. The heater unit 119, when not being subjected to the pressure of the compression spring 105, is movable relative to the guide member 107 in the film conveying direction, as described above. FIG. 7 is a perspective view of a portion for moving the heater 109 viewed from the longitudinal center of the film 106 illustrating the mechanism for moving the heater unit 119. The side plate 103R, the film 106, the flange 111R, the reinforcing stay 112, and so on are omitted for ease of illustration of the mechanism.

As shown in FIG. 7, the support member 110R includes tabs 110*c* and 110*d* and is restricted in position with respect to the guide member 107 in the pressure direction of the compression spring 105R. The support member 110R is attached to the guide member 107 with the tab 110*d* so as not to be dropped off the guide member 107. The heater unit 119 is movable relative to the guide member 107 in the conveying direction of the printing material P within the range of the play between the heater unit 119 and the recess 107*a* of the guide member 107.

In this embodiment, the play between the recess 107*a* and the heater 109 is about 2 to 3 mm. The support member 110R has a boss 110*b*, on the upstream side surface in the printing material conveying direction, joined to the link member 120. An end opposite to the end of the link member 120 joined to the boss 110*b* is joined to a boss 121*b* (FIGS. 8A and 8B) at the link member 121. The link member 121 is secured to the pressure plate 104R and moves together with the pressure plate 104R.

Figure 8A:
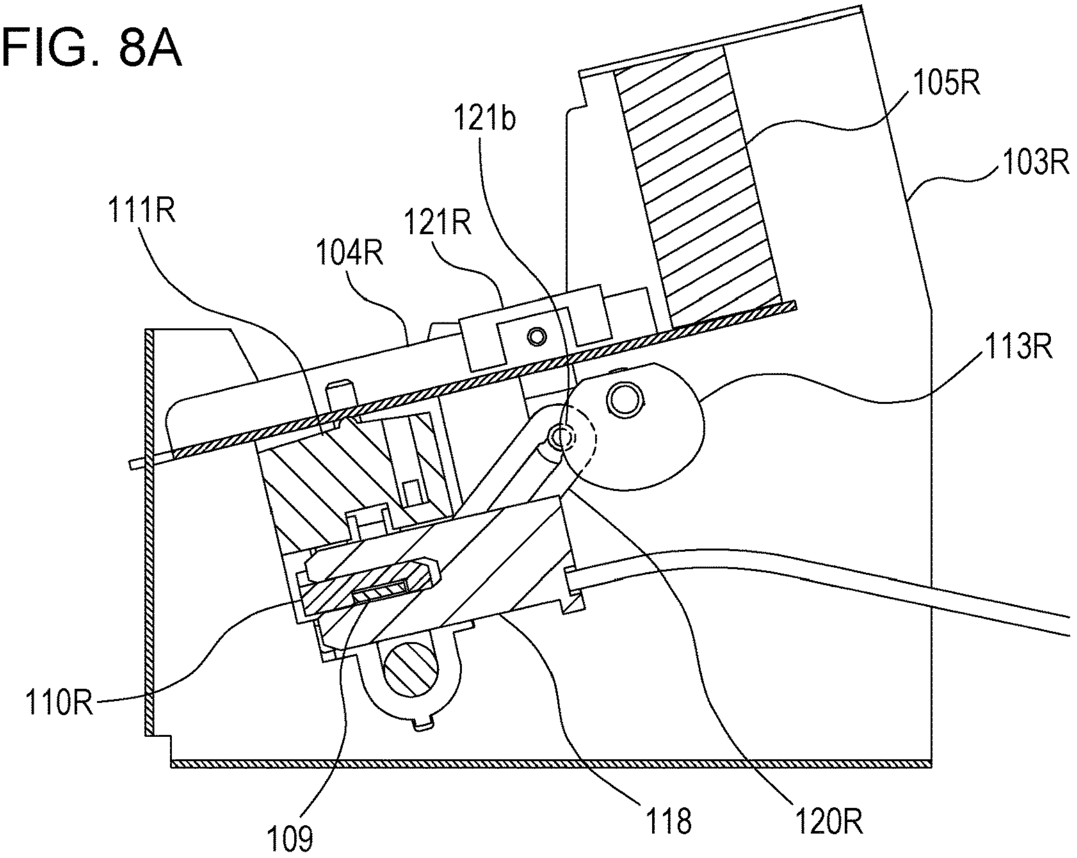
FIGS. 8A and 8B are schematic cross-sectional diagrams illustrating the operation of a heater moving mechanism according to the first embodiment.
Figure 8B:
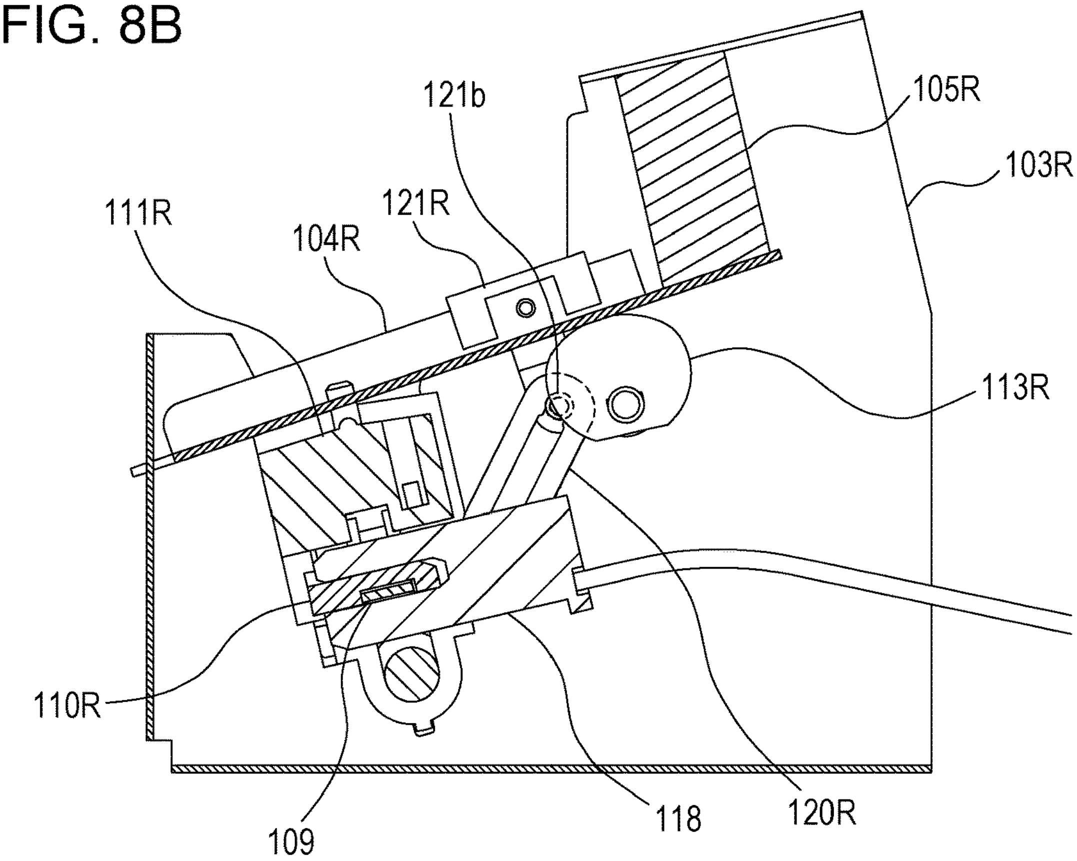
Figure 9A:
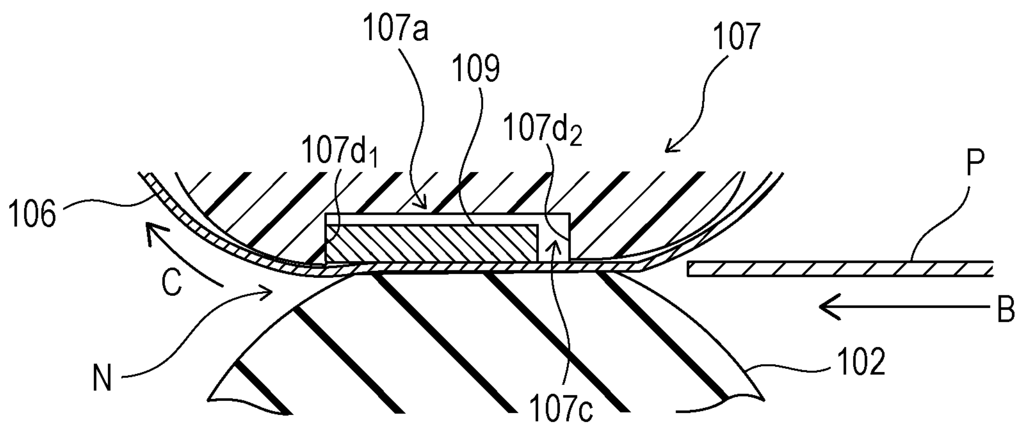
FIGS. 9A and 9B are cross-sectional diagrams illustrating the motion of a heater according to the first embodiment.
Figure 9B:
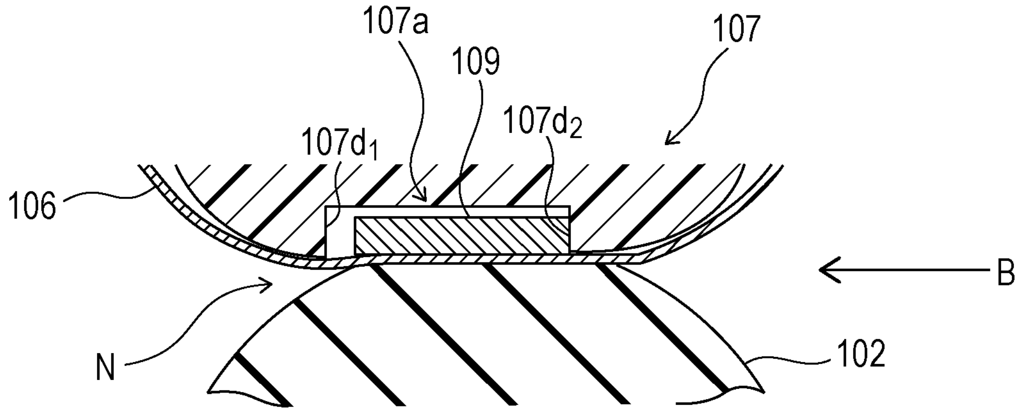

The operation of the heater 109 will be described with reference to FIGS. 8A and 8B and FIGS. 9A and 9B. FIGS. 8A and 8B are schematic cross-sectional diagrams illustrating an operation for releasing pressure to the film unit 101 and the operation of the heater moving mechanism. FIGS. 9A and 9B are cross-sectional diagrams illustrating the periphery of the heater 109 provided in the film 106 in enlarged view. FIGS. 8A and 9A illustrate a state in which the film 106 is driven to rotate by the pressure and rotation of the pressure roller 102 while the printing material P is being conveyed. FIGS. 8B and 9B illustrate a state in which the pressure to the pressure roller 102 is released. As shown in FIG. 8A, when the film 106 is driven to rotate by the pressure and rotation of the pressure roller 102, the heater 109 is subjected to a force in the conveying direction B of the printing material P by the frictional force between the surface of the heater 109 and the inner surface of the film 106 and the grease applied to the surface of the heater 109. These forces cause the heater 109 to butt against an end 107$d_1$ of the recess 107*a* of the guide member 107 downstream in the printing material conveying direction B to position the heater 109. At that time, the not-butting end face of the heater 109 and an opposite end 107$d_2$ form a gap 107*c*, in which the grease applied to the surface of the heater 109 accumulates.

The pressure to the pressure roller 102 is released when a jam is to be cleared or when the power is turned off to prevent unwanted bending of the film 106. Specifically, a pressure release cam 113R is rotated by a motor to push the pressure plate 104R upward. This releases the pressure to the flange 111R from the pressure plate 104R and releases the pressure to the pressure roller 102 together with the flange 111R. At that time, the pressure plate 104R is pushed up by the pressure release cam 113R, and a link member 121R held by the pressure plate 104R is also moved. As the link member 121R moves, a link member 120R joined to the link member 121R moves to move the support member 110R upstream in the printing material conveying direction.

The pressure plate 104L is also pushed up by a cam 113L (not shown). The two cams 113R and 113L are joined together with a shaft and rotate in synchronization. The pressure plate 104L also has the same link mechanism similar as that of the pressure plate 104R.

The motion of the link mechanisms causes the support members 110L and 110R supporting the opposite ends of the heater 109 to move upstream in the printing material conveying direction, and with this motion, the heater unit 119, that is, the heater 109, also moves upstream in the printing material conveying direction. The heater 109, which has moved upstream in the conveying direction, moves until the heater 109 butts against the end 107$d_2$ of the recess 107*a* of the guide member 107 upstream in the conveying direction. As the heater 109 moves, the grease accumulated between the upstream end 107$d_2$ and an end of the heater 109 is pushed out to the film 106. The grease pushed out in this manner again comes into contact with the inner surface of the film 106 to contribute to an increase in the sliding performance of the heater 109 and the film 106.

In this embodiment, the pressure release timing at the fixing nip N is the moving timing of the heater unit 119. The pressure release timing at the fixing nip N is set at jam clearing or power-off but may be set at another timing.

Thus, the fixing apparatus 10 of the first embodiment includes the support member 110 fixed to an end of the heater 109 in the longitudinal direction and a moving mechanism for moving the support member 110 relative to the guide member 107 in the direction parallel to the conveying direction. The fixing apparatus 10 further includes a pressure applying mechanism for applying pressure to the fixing nip N and a pressure release mechanism for releasing the pressure applied to the fixing nip N by acting on the pressure applying mechanism. The moving mechanism moves the support member in the direction parallel to the conveying direction in conjunction with the operation of the pressure release mechanism. The fixing apparatus 10 further includes the link member 121 connecting the pressure applying mechanism and the support member 110 together.

Second Embodiment

Referring to FIGS. 10 to 15, a second embodiment will be described. The difference from the first embodiment is the shapes of the guide member and the support member and the heater moving mechanism, and the others are substantially the same. The description of the configuration common to the first embodiment is omitted.

Figure 10:
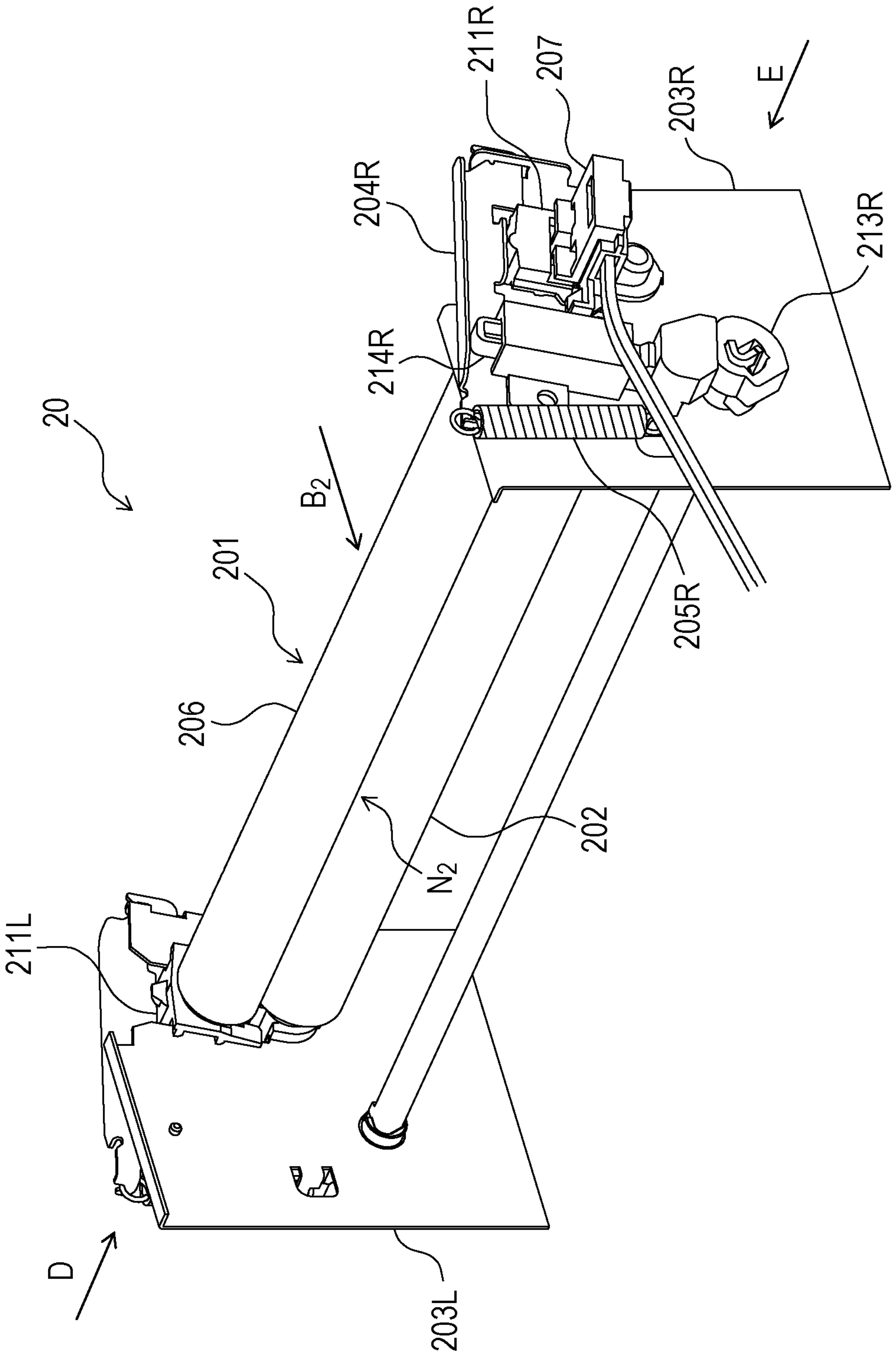
FIG. 10 is a perspective diagram illustrating the configuration of a fixing apparatus according to a second embodiment.

FIG. 10 is a perspective view of a fixing apparatus 20 according to the second embodiment. The printing material conveying direction of the fixing apparatus 20 is the direction of arrow $B_2$. A film unit 201 of this embodiment includes a tubular film 206 and a guide member 207 that rotatably supports the film 206 from inside, similarly to the film unit 101 of the first embodiment. The film unit 201 further includes flanges 211L and 211R, a reinforcing stay 212, and a heater 209. The components indicated by arrow D and the components indicated by arrow E in FIG. 10 are distinguished from each other by adding L and R at the end of reference signs indicating the components, like flanges 211L and 211R. Although the configuration at the opposite ends of the film unit 201 differs from the first embodiment, the configuration of the printing material passing portion, which is inside the flanges 211L and 211R in the film longitudinal direction, is the same as the configuration of the film unit 101 of the first embodiment, and a description thereof is omitted.

Figure 11A:
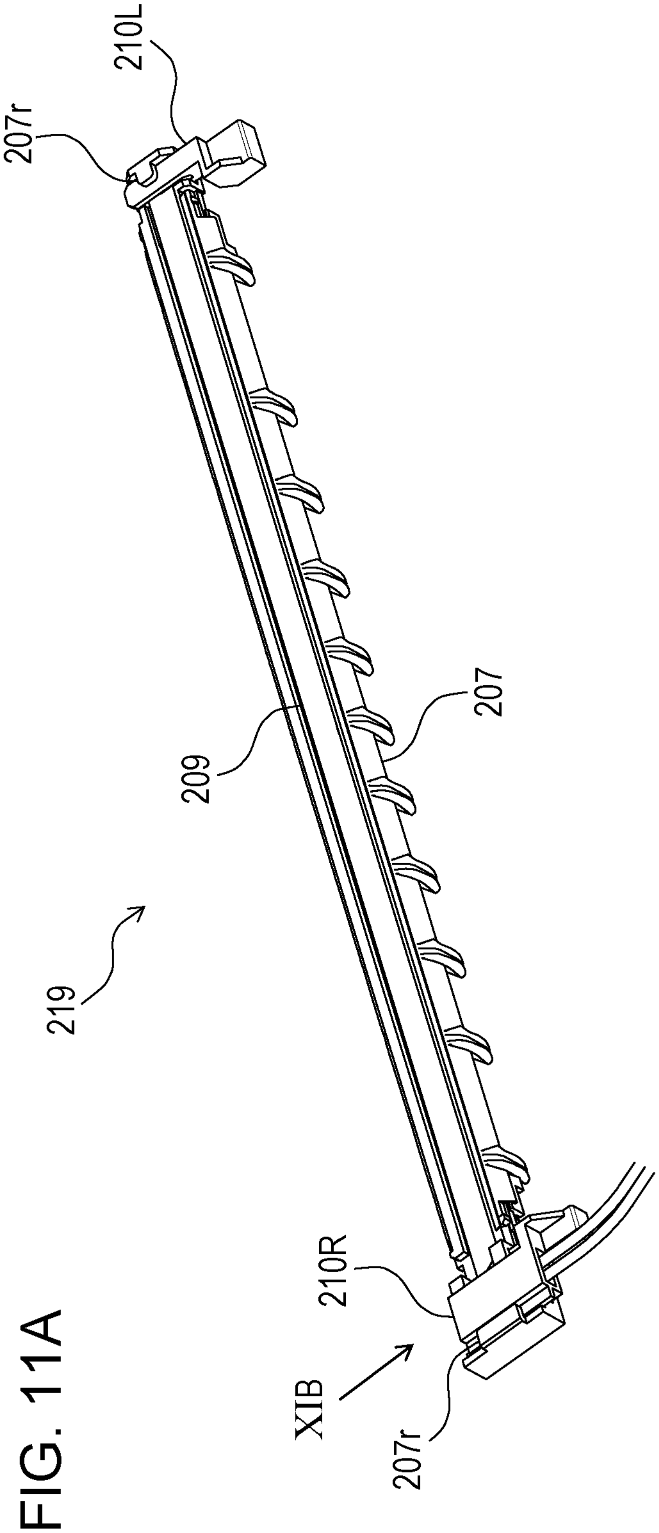
FIG. 11A is a perspective diagram illustrating the configuration of a heater unit according to the second embodiment.
Figure 11B:
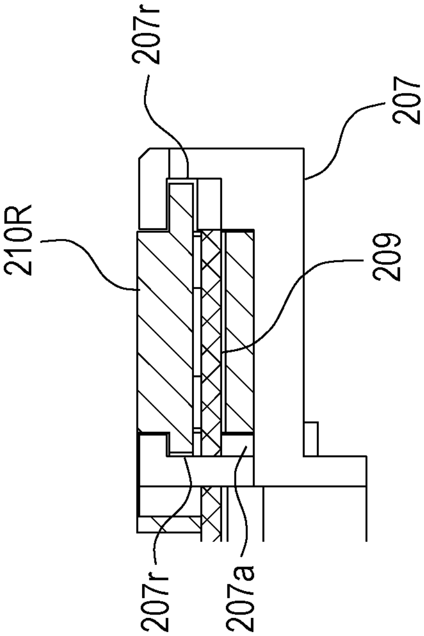
FIG. 11B is a partial diagram of the heater unit according to the second embodiment.
Figure 12:
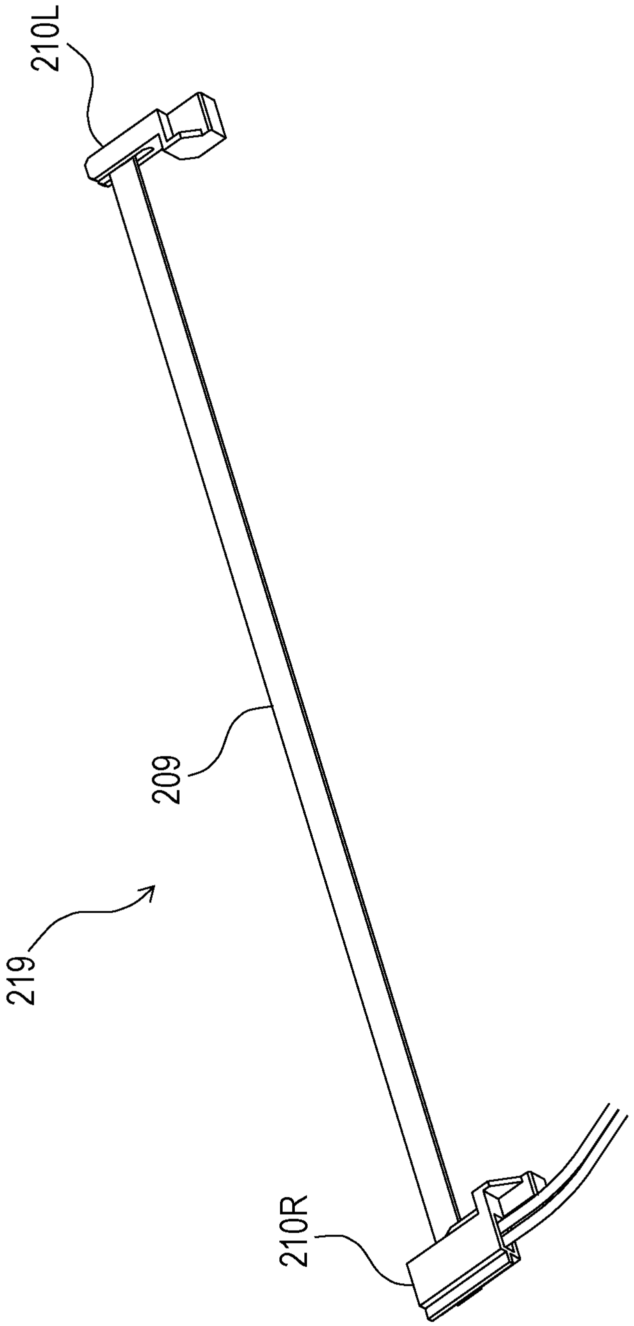
FIG. 12 is a perspective diagram illustrating the configuration of the heater unit according to the second embodiment.

Next, the configuration of a heater unit 219 of this embodiment will be described with reference to FIGS. 11A and 11B and FIG. 12. FIG. 11A is a perspective view of the guide member 207 that supports the film 206 and the heater 209, which are part of the film unit 201, illustrating the peripheral configuration viewed from the heater surface. FIG. 11B is a partial diagram of the guide member 207 viewed from the direction of arrow XIB in FIG. 11A. FIG. 12 is a diagram illustrating the configuration of the heater unit 219 movably attached to the guide member 207.

As shown in FIGS. 11A and 11B, the guide member 207 has a recess 207*a* for housing the heater 209, as in the first embodiment. The shape of the opposite ends of the guide member 207 differs from that of the guide member 107 of the first embodiment. The guide member 207 has rail-shaped portions 207*r* at the opposite ends, in which part of support portions 210L and 210R is placed so that the support portions 210L and 210R can move relative to the guide member 207 in the printing material conveying direction.

As shown in FIG. 12, the heater unit 219 of the fixing apparatus 20 includes the heater 209 and the support members 210L and 210R. The support member 210R adjacent to the electric contact of the heater 209 also serves as a feeding connector including a feed terminal inside. The support member 210R feeds power to the heater 209 and is positioned and fixed to the heater 209, with the heater 209 held therebetween. The support member 210L at the other end is also positioned and fixed to the heater 209, with the heater 209 held therebetween, similarly to the support member 210R. The support member 210L only needs the function of holding and fixing the heater 209 and having no power feeding function but may include a feed terminal like the support member 210R.

The width of the recess 207*a* is larger than the width of the heater 209 in the film conveying direction. For this reason, there is a gap between them. The support members 210L and 210R are movable relative to the guide member 207 in the conveying direction of the film 206. The heater unit 219 is movable in the film conveying direction, with the pressure roller 102 under no pressure. The pressurizing configuration is similar to that of the first embodiment except that the compression spring 105 is replaced with a tension spring 205. However, the pressure may be applied using a compression spring as in the first embodiment.

Figure 13A:
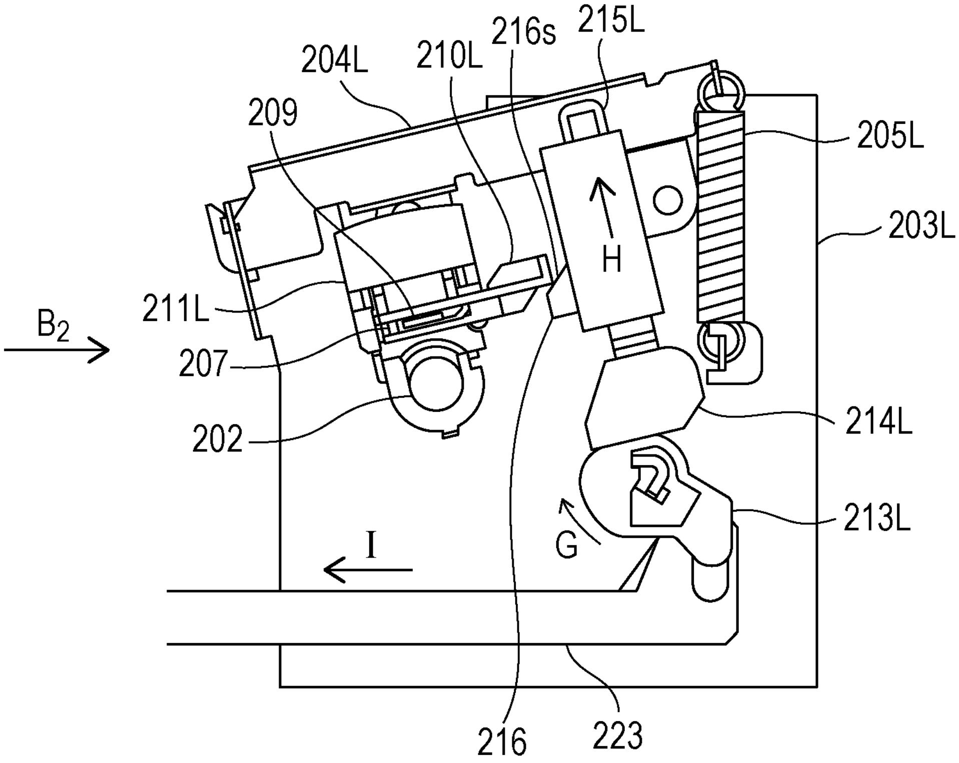
FIGS. 13A and 13B are side views of a heater moving mechanism according to the second embodiment.
Figure 13B:
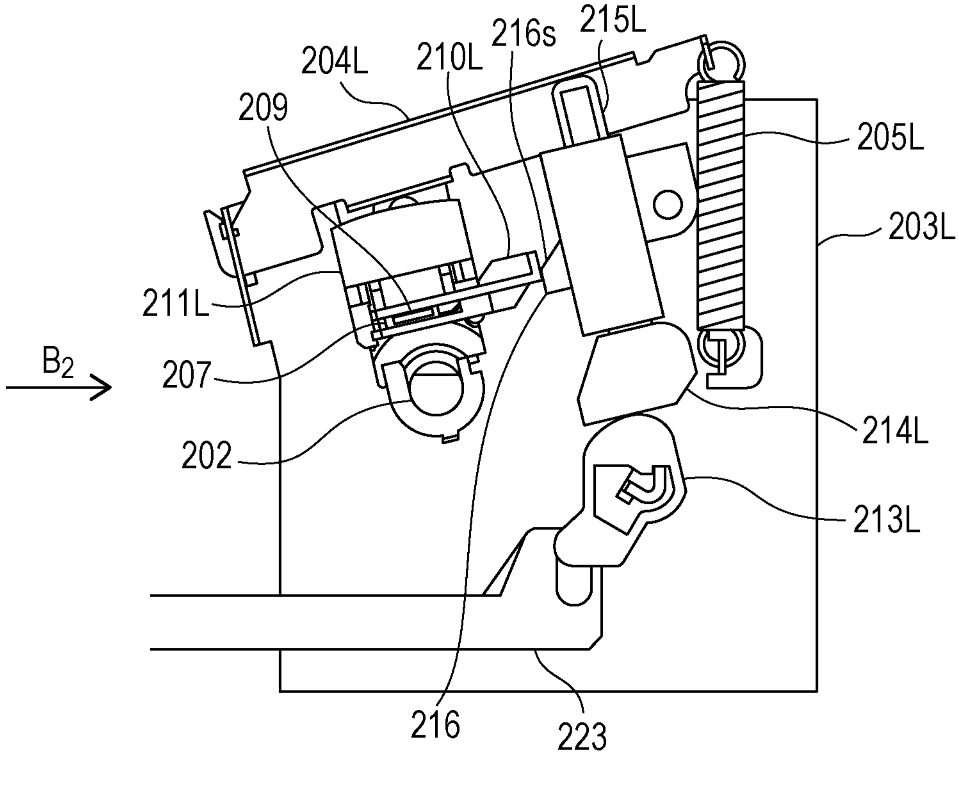

Next, the heater moving mechanism of the fixing apparatus 20 will be described with reference to FIGS. 13A and 13B and FIGS. 14A to 14C. FIG. 13A is a side view of the fixing apparatus 20 in a pressurized state viewed from the direction of arrow D in FIG. 10. FIG. 13B is a side view of the fixing apparatus 20 in a pressure released state viewed from the same direction as in FIG. 13A.

FIG. 13A illustrates a state in which the film 206 is driven to rotate by the pressure and rotation of the pressure roller 202 as when the printing material P is being conveyed. When the film 206 is driven to rotate, the heater 209 is subjected to a force in the conveying direction of the film 206 by the frictional force between the surface of the heater 209 and the inner surface of the film 206 and the grease applied to the surface of the heater 209 as in the first embodiment. This causes the heater 209 to butt against the downstream end of the recess 207*a* of the guide member 207 in the printing material P conveying direction. At that time, the not-butting end face of the heater 209 and the opposite end form a gap, in which the grease accumulates. The positional relationship between the heater 209 and the recess 207*a* of the guide member 207 is the same as the relationship in the first embodiment shown in FIG. 9A.

Figure 14A:
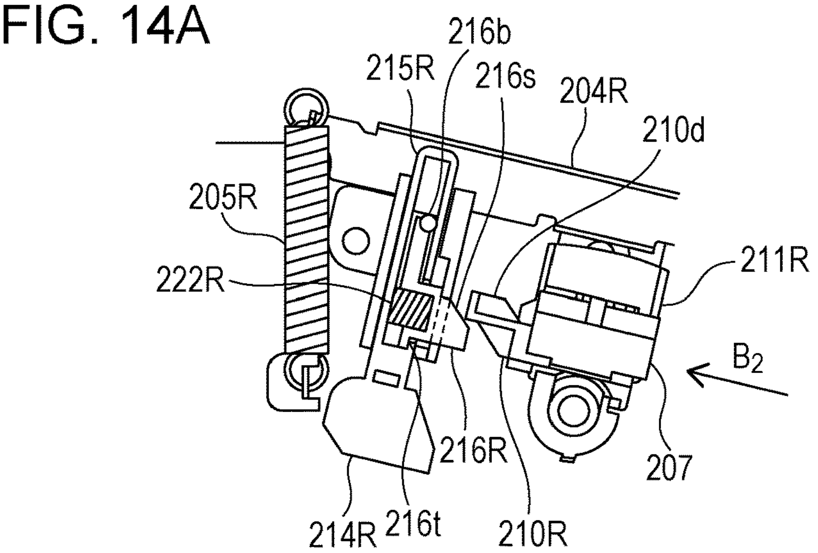
FIGS. 14A to 14C are diagrams illustrating the configuration and the behavior of a lever according to the second embodiment.
Figure 14B:
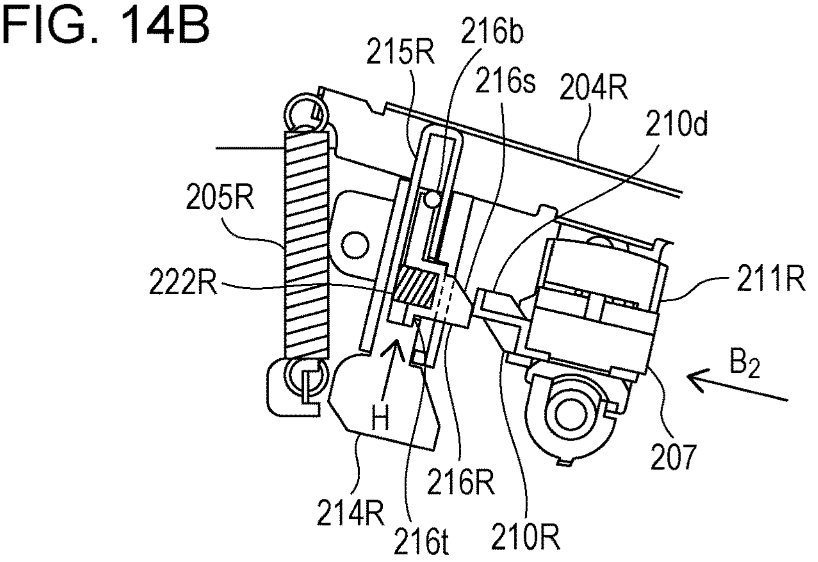
Figure 14C:
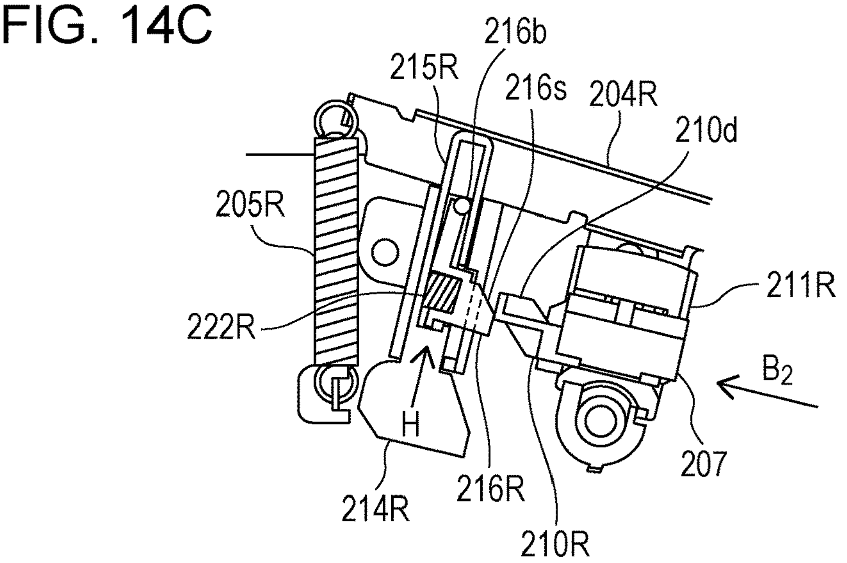

Next, the pressure releasing operation at a fixing nip $N_2$ and the specific motions of the heater unit 219 and the heater 209 will be described. First, the configuration of levers 214L and 214R that push up pressure sheet metals 204L and 204R, respectively, will be described. FIGS. 14A to 14C are schematic cross-sectional views of the lever 214R illustrating the structure thereof. FIG. 14A illustrates the state of the pressure roller 202 under pressure, that is, the state of the lever 214R corresponding to the state in FIG. 13A. The lever 214R includes a lever main body 215R, and a pushing member 216R that pushes the support member 210R and a compression spring 222R that pushes the pushing member 216R, which are provided in the lever main body 215R. The pushing member 216R is attached to the lever main body 215R so as to be rotatable about a shaft 216*b* and is pushed by the compression spring 222R from a surface opposite to a portion in contact with the support member 210R. In the state in FIG. 14A, a stopper 216*t* provided at the pushing member 216R butts against the inner wall of the lever main body 215R. This allows the position of the pushing member 216R relative to the lever main body 215R to be restricted. These configurations also apply to the lever 214L.

In the fixing apparatus 20, pressure to the pressure roller 202 is released by the lever 214, which is pushed up by a cam 213, pushing the pressure sheet metal 204 upward. In FIG. 13A, when a cam 213L rotates in the direction G, the lever 214L in contact with the cam 213L moves in the direction in which the pressure to the pressure roller 202 is released (the direction of arrow H). When the lever 214L moves in the direction of arrow H, the end of the lever main body 215L pushes up the pressure sheet metal 204L to release the flange 211L subjected to the pressure from the pressure sheet metal 204L.

The cam 213L is joined to an opposed cam 213R with a corresponding shape by an L-shaped sheet metal shaft so that the two cams 213L and 213R move in synchronization. This allows the opposed lever 214R to push up the pressure sheet metal 204R at the same time the lever 214L pushes up the pressure sheet metal 204L to release the pressure to the pressure roller 202.

When the lever main body 215R is moved in the pressure release direction by the cam 213R, the pushing member 216R also moves in the same direction in conjunction therewith. When the pressure to the pressure roller 202 begins to be decreased by the lever main body 215R, an inclined surface 216*s* of the pushing member 216R comes into contact with a protrusion 210*d* of the support member 210R to push the protrusion 210*d* upstream in the printing material conveying direction with the movement of the lever 216R. This state is shown in FIG. 14B.

Since the cams 213L and 213R move in synchronization, as described above, the pushing member 216L operates in the same way. Since the support members 210L and 210R at the opposite ends move upstream in the printing material conveying direction, the heater 209 also moves in the same direction. The heater 209, which has moved upstream in the conveying direction, moves until heater 209 butts against an end of the recess 207*a* of the guide member 207 upstream in the conveying direction upstream. The grease accumulated between the upstream end and the end of the heater 209 is pushed out to the film 206. The positional relationship between the heater 209 and the recess 207 of the guide member 207 is the same as the relationship of the first embodiment shown in FIG. 9B. The grease pushed out in this manner contributes to an increase in the sliding performance of the heater 209 and the film 206.

The fixing apparatus 20 includes the compression springs 222L and 222R, which are elastic members, between the pushing members 216L and 216R and the lever main bodies 215L and 215R, respectively. FIG. 14C illustrates a state in which the pushing member 216 pushes the support member 210 in a state in which the heater 209 butts against an end of the recess 207*a* upstream in the conveying direction. At that time, the compression springs 222L and 222R are compressed, thereby reducing a load exserted on the feed terminal of the support member 210 and the heater 209 to reduce or minimize damage to these components.

Figure 15:
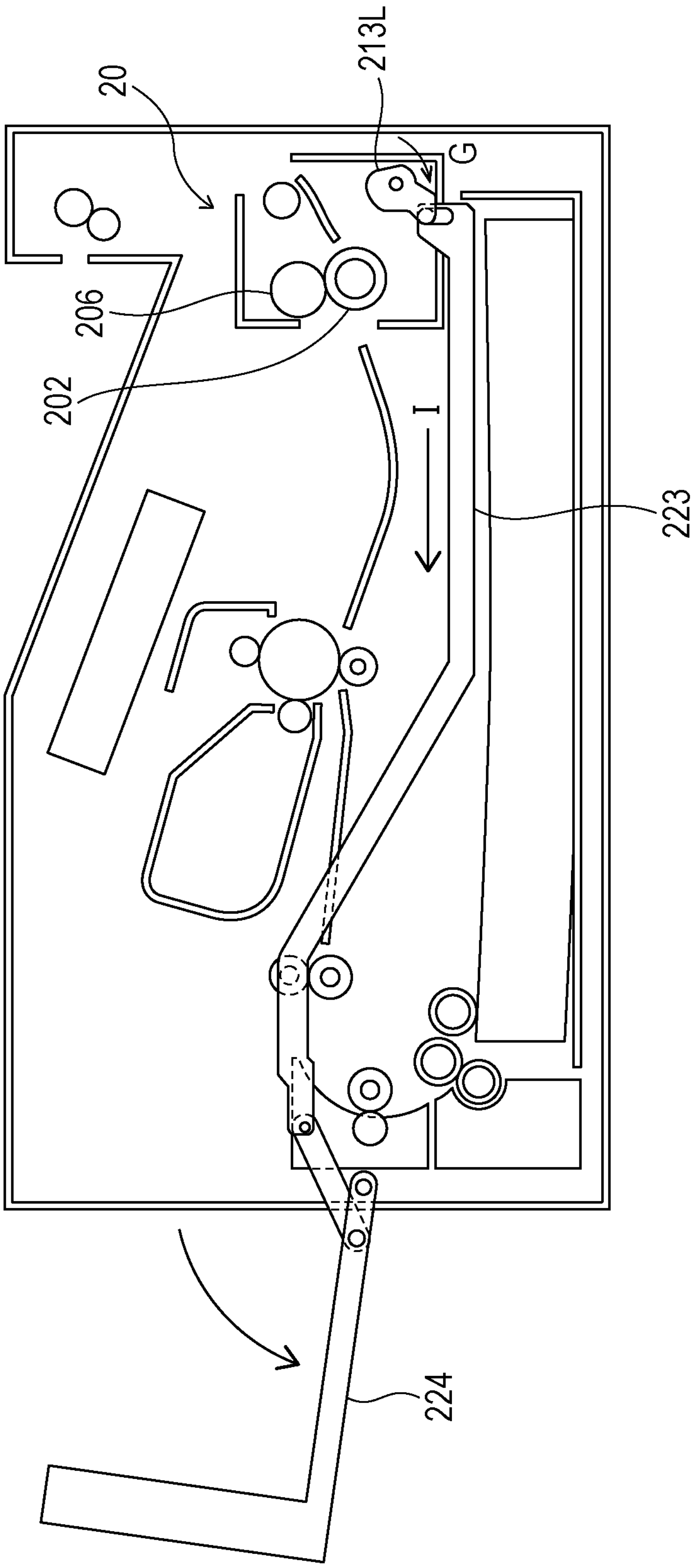
FIG. 15 is a cross sectional view of an image forming apparatus including the fixing apparatus according to the second embodiment.

In the first embodiment, the pressure is released by rotating the cams 113L and 113R using the driving force of a motor. In contrast, in the second embodiment, the cams 213L and 213R are rotated by the movement of a link member 223 joined to the cam 213L shown in FIG. 13A in the direction of arrow I. FIG. 15 illustrates an example of an image forming apparatus including the fixing apparatus 20. In the image forming apparatus shown in FIG. 15, the link member 223 is joined to part of a front door 224 of the image forming apparatus main body and moves in conjunction with the opening/closing motion of the front door 224. When the front door 224 opens, the link member 223 moves forward in front of the main body (the direction of arrow I), and the cam 213 joined to the link member 223 rotates in the direction G of FIG. 13A. Moving the cam 213 in conjunction with the opening/closing of the front door 224 in this way eliminates the need for a driving source, such as a motor.

In this embodiment, the cam 213L is joined to part of the front door 224. In another embodiment, operatively connecting the cam 213L with a door that rotates about an axis that is substantially parallel to the axis of rotation of the pressure roller 202, for example, the rear door of the image forming apparatus main body, can provide equivalent effects.

Third Embodiment

Figure 16:
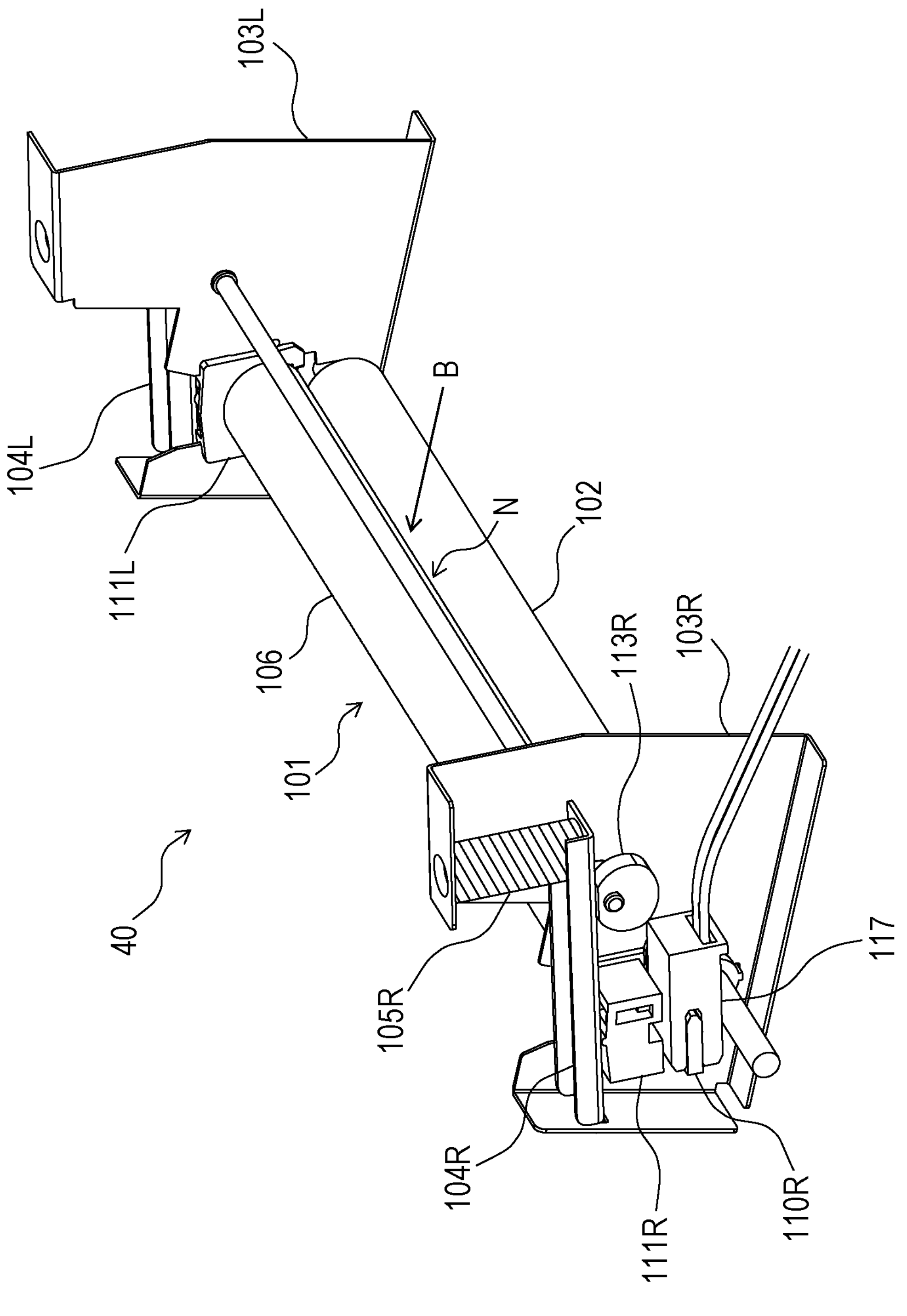
FIG. 16 is a perspective diagram illustrating the configuration of a fixing apparatus according to a third embodiment.

FIG. 16 illustrates a fixing apparatus 40 according to a third embodiment. The configuration of the fixing apparatus 40 is the same as that of the fixing apparatus 10 in the first embodiment, except that the link members 120L and 120R and the link members 121L and 121R, which constitute a heater moving mechanism, are excluded, and the film unit and the other configurations are the same.

The fixing apparatus 40 does not need the heater moving mechanism to move the heater 109 and moves the heater 109 upstream in the printing material conveying direction by reversely rotating a motor capable of forward-backward rotation (not shown) that transmits a driving force to the pressure roller 102. The rotation of the motor in conveying the printing material P in the normal conveying direction indicated by arrow B in FIG. 4 is referred to as forward rotation, and rotation in the opposite direction is referred to as backward rotation. When the motor rotates forward, and the film 106 is driven to rotate by the rotation of the pressure roller 102, as described above, the heater 109 butts against the end 107$d_1$ of the recess 107*a* of the guide member 107 (shown in FIGS. 9A and 9B) downstream in the conveying direction of the printing material P.

When the motor is rotated backward, the heater 109 butts against the 107$d_2$ upstream in the printing material conveying direction on the basis of the same principle as when the heater 109 butts against the end 107$d_1$ downstream in the printing material P conveying direction, allowing the grease accumulated in the gap 107*c* to be pushed out to the film surface. In this manner, the third embodiment can release the grease accumulated in the gap 107*c* at any timing during non-paper-running period by controlling the motor to rotate backward. The backward rotation control may be performed at the timing of power OFF or ON, at regular intervals, or at a predetermined timing.

Thus, the fixing apparatus 40 of the third embodiment includes a motor capable of forward/backward rotation for driving the pressure roller 102 and rotates the motor forward and backward in convey the printing material P at the fixing nip N to move the support member 110 in the direction parallel to the conveying direction.

In the first to third embodiments, the heater is moved relative to the guide member. However, the present disclosure is applicable also to an apparatus in which the heater is not used as a member that holds the film with a driving roller (for example, a pressure roller), like a fixing apparatus in which the film itself generates heat. Such an apparatus may use a nip forming plate, which is a component for holding the film, instead of the heater, and move the nip forming plate in conjunction with the pressure release operation, or using the backward rotation of the motor.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-166627, filed Oct. 18, 2022, which is hereby incorporated by reference herein in its entirety.

What is claimed is:

1. A fixing apparatus to fix a toner image to a printing material on which the toner image is formed while nipping and conveying the printing material at a fixing nip, the fixing apparatus comprising:

- a film having a tubular shape around an inner space of the film;
- a guide member that is configured to guide rotation of the film and is in the inner space of the film;
- a nip-forming member that is plate-like and is in a recess of the guide member;

a roller in contact with an outer circumferential surface of the film, wherein the roller sandwiches the film with the nip-forming member to form the fixing nip, the recess is larger in width than the nip-forming member in a conveying direction of the printing material, and, when disposed in the recess, the nip-forming member is movable in a direction parallel to the conveying direction;

a support member fixed to an end of the nip-forming member in a longitudinal direction; and a moving mechanism configured to move the nip-forming member in the direction parallel to the conveying direction by moving the support member relative to the guide member in the direction parallel to the conveying direction.

2. The fixing apparatus according to claim 1, further comprising:

a pressure applying mechanism configured to apply pressure to the fixing nip; and a pressure release mechanism configured to release the pressure applied to the fixing nip by acting on the pressure applying mechanism, wherein, in conjunction with an operation of the pressure release mechanism, the moving mechanism moves the support member in the direction parallel to the conveying direction.

3. The fixing apparatus according to claim 2, further comprising a link member connecting the pressure applying mechanism and the support member together.

4. The fixing apparatus according to claim 1, further comprising a motor capable of forward and backward rotation and configured to drive the roller, wherein, when the printing material is to be conveyed at the fixing nip, the motor is rotated forward, and when the support member is to be moved in the direction parallel to the conveying direction, the motor is rotated backward.

5. The fixing apparatus according to claim 1, wherein the nip-forming member includes a heater.

6. The fixing apparatus according to claim 5, wherein the support member includes a feeding connector configured to feed power to the heater.

* * * * *